United States Patent

[11] 3,628,123

[72] Inventors John Rosa
Pittsburgh;
Theodore M. Heinrich, Murrysville, both of Pa.
[21] Appl. No. 18,549
[22] Filed Mar. 11, 1970
[45] Patented Dec. 14, 1971
[73] Assignee Westinghouse Electric Corporation
Pittsburgh, Pa.

[54] APPARATUS FOR HARMONIC NEUTRALIZATION OF INVERTERS
10 Claims, 14 Drawing Figs.

[52] U.S. Cl. .................................................... 321/9 R, 321/26, 321/27 R
[51] Int. Cl. .................................................... H02m 1/12

[50] Field of Search ................................. 321/5, 9 A, 27, 26, DIG. 1

[56] References Cited
UNITED STATES PATENTS

| | | | |
|---|---|---|---|
| 3,346,794 | 10/1967 | Stemmler | 321/9 A |
| 3,419,785 | 12/1968 | Lafuze | 321/5 X |
| 3,421,071 | 1/1969 | Cassel | 321/26 |
| 3,431,483 | 3/1969 | Lafuze | 321/26 X |

*Primary Examiner*—William M. Shoop, Jr.
*Attorneys*—F. H. Henson, C. F. Renz and M. P. Lynch

ABSTRACT: Apparatus for neutralizing harmonic components of DC to AC power inverter systems utilizing a pyramidal scheme of interconnection of interphase transformers operatively connected to a plurality of individual inverter stages comprising a power inverter system.

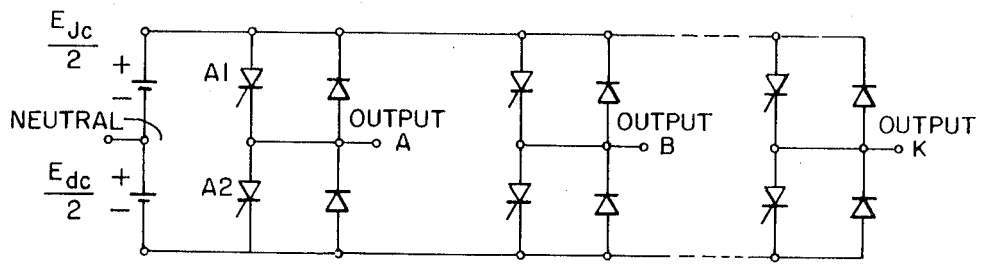
FIG. 1
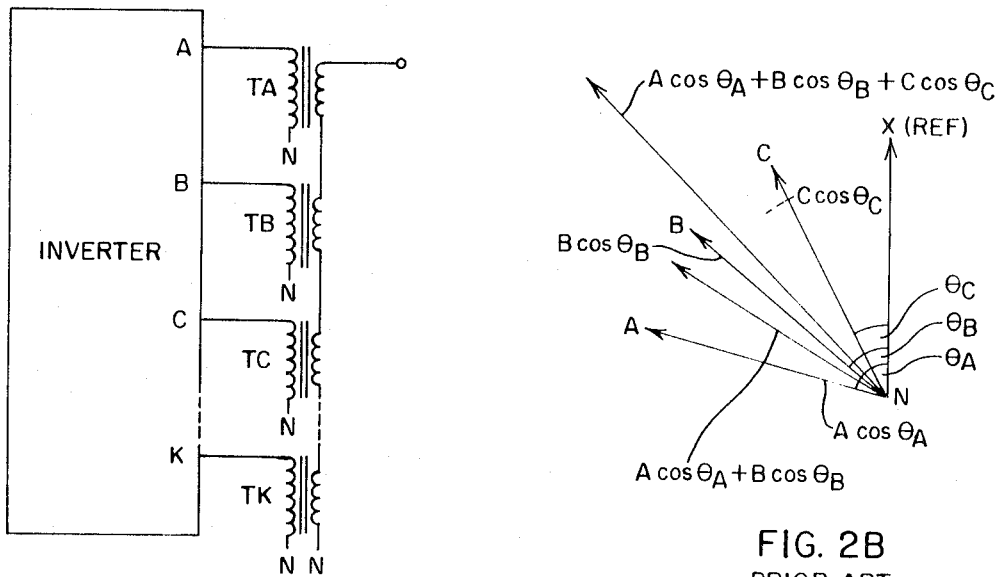
FIG. 2A
PRIOR ART
FIG. 2B
PRIOR ART
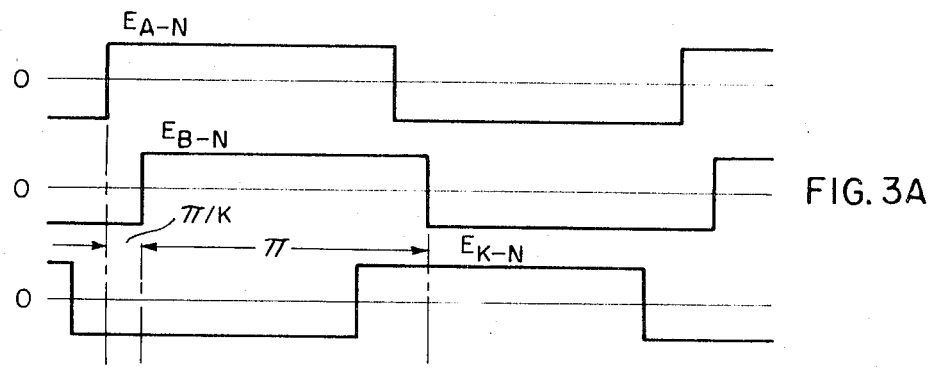
FIG. 3A
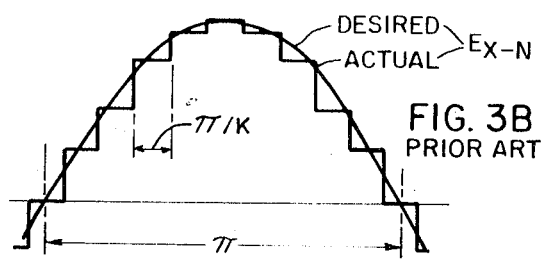
FIG. 3B
PRIOR ART
INVENTORS
John Rosa &
Theodore M. Heinrich
BY Michael P. Lynch
ATTORNEY Patented Dec. 14, 1971
3,628,123
4 Sheets-Sheet 4
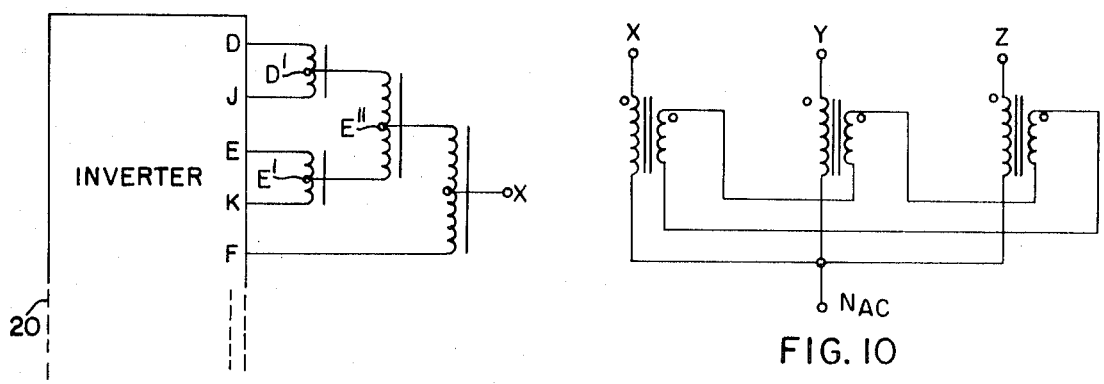
FIG. 9
FIG. 10
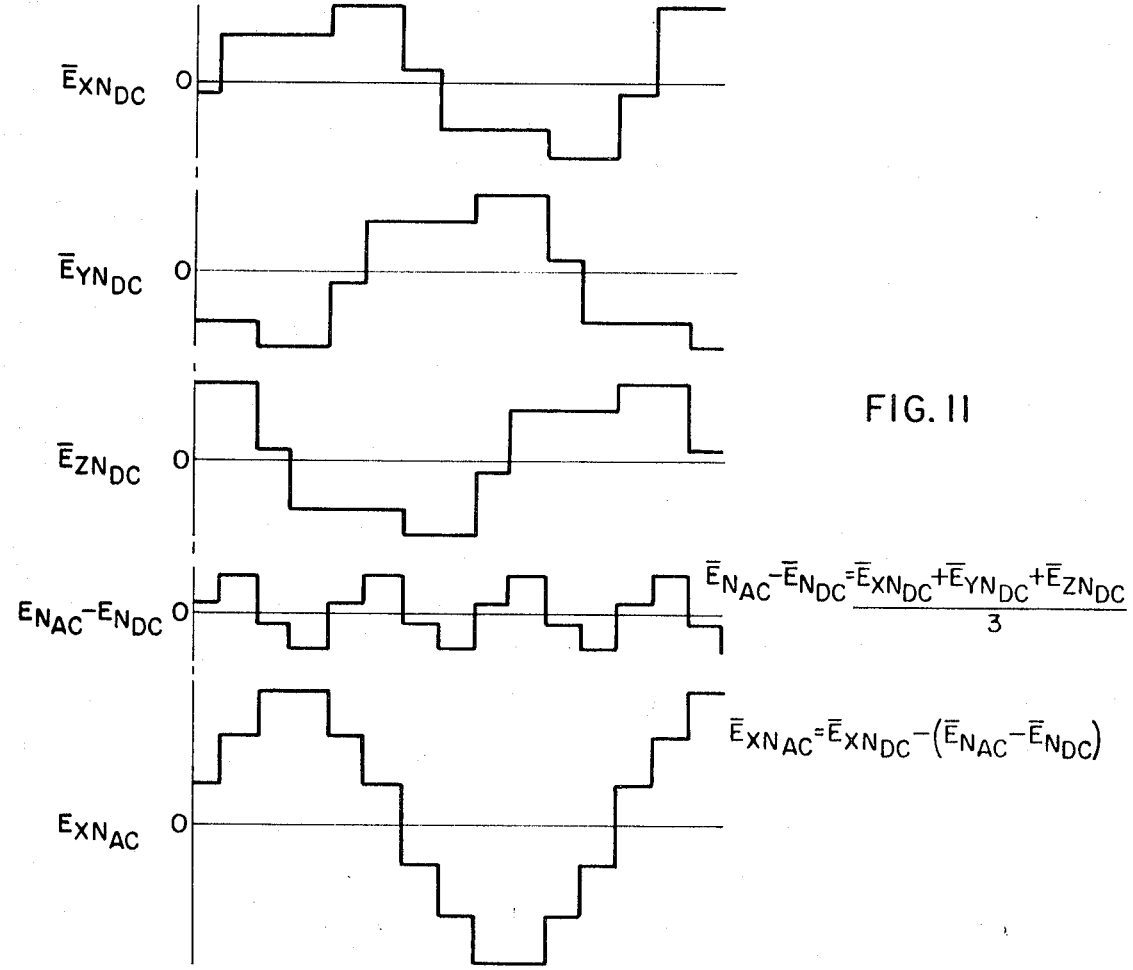
FIG. 11
$$\overline{E}_{N_{AC}} - \overline{E}_{N_{DC}} = \frac{\overline{E}_{XN_{DC}} + \overline{E}_{YN_{DC}} + \overline{E}_{ZN_{DC}}}{3}$$
$$\overline{E}_{XN_{AC}} = \overline{E}_{XN_{DC}} - (\overline{E}_{N_{AC}} - \overline{E}_{N_{DC}})$$

APPARATUS FOR HARMONIC NEUTRALIZATION OF INVERTERS

BACKGROUND OF THE INVENTION

This invention is related in general to apparatus for converting DC power to low-distortion sinusoidal AC power by the compilation of the output voltage waveforms of a plurality of solid state square wave inverters, and in particular to method and apparatus for neutralizing the harmonic components of the individual inverter output voltage waveforms.

A basic scheme for providing harmonic neutralization of inverters is described in U.S. Pat. No. 3,491,282, issued to T. M. Heinrich and A. Kernick, Jan. 20, 1970, and assigned to the assignee of the present invention.

The Heinrich-Kernick scheme consists of synthesizing a stepwise approximated sinusoidal output waveform by adding the outputs of a plurality of square wave inverter stages which are sequentially phase displaced from one another $\pi/K$ radians, where K is the number of square wave inverter stages. The addition is accomplished by series connecting the secondary windings of the isolation transformers associated with each square wave inverter stage.

This technique produces a final output voltage waveform in which only harmonics of the $2nK \pm 1$ (where $n=1, 2, 3...$all positive integers) order are present. This technique therefore substantially reduces the requirement for heavy, expensive filter circuits generally required to reduce the harmonic content of conventional inverter output transformers.

A disadvantage does exist however in this scheme in that in order to obtain a three-phase harmonic neutralized output waveform, each inverter stage generally requires an output transformer with three isolated secondary windings, one for each output phase. This requirement results in an increase of the per unit KVA rating of the transformers in comparison to the transformers used in a conventional square wave inverter. Typically the effective KVA rating of the required transformer windings in the Heinrich-Kernick scheme is 2.86 units of output power for $K=3$, and about 2.80 for $K=6$. This compares to an effective output transformer rating of 2.46 units of output power for the conventional square wave inverter.

Therefore the substantial output filter weight and cost savings provided by the Heinrich-Kernick harmonic neutralized inverter is partially offset by the undesirable increase in transformer rating.

SUMMARY OF THE INVENTION

The invention comprises a scheme of interconnecting the transformers associated with each inverter stage of a plurality of inverter stages comprising a DC power conversion system in a concatenated, or cascade arrangement as contrasted to the series arrangement disclosed in U.S. Pat. No. 3,491,282. This scheme, which utilizes interphase transformers, results in reductions of greater than 50 percent in the required transformer ratings.

The invention will become more readily apparent from the following exemplary description in connection with the accompanying drawing.

DESCRIPTION OF THE DRAWING

FIG. 1 is a schematic illustration of an inverter comprised of K stages,

FIGS. 2A, 2B, 3A and 3B are illustrations of a prior art harmonic neutralization technique employed with the inverter of FIG. 1, FIG. 9 is a schematic illustration of the interconnect pattern of the inverter stages to provide a phasor relationship of FIG. 8, FIG. 10 illustrates a tertiary winding employed with the three-phase output of the inverter to provide harmonic neutralized line-to-AC neutral voltages, FIG. 11 illustrates the waveshapes corresponding to the inverter operations utilizing the tertiary output winding.

DESCRIPTION OF THE PREFERRED EMBODIMENT

Figure 4:
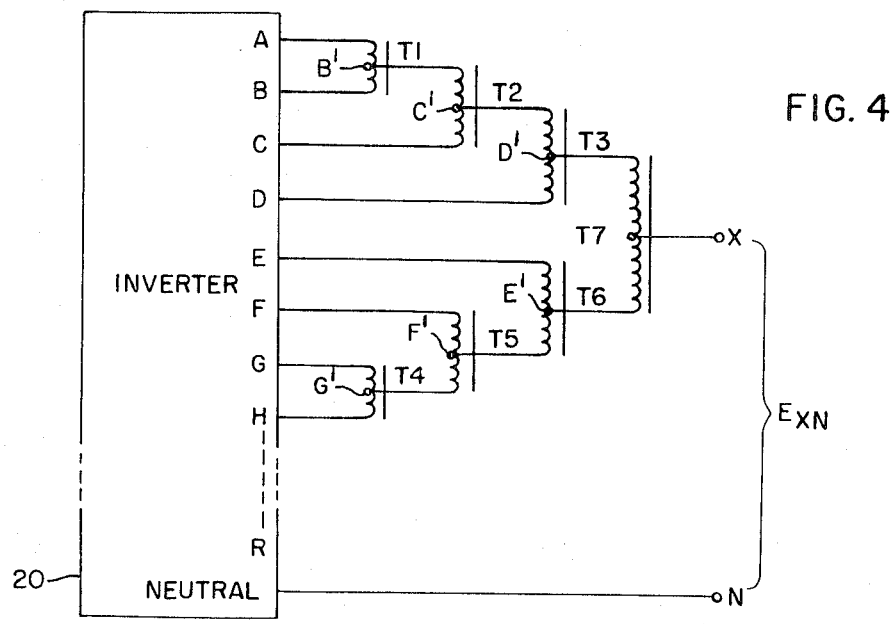
FIG. 4 is a schematic illustration of a novel arrangement for interconnecting the stages of the inverter of FIG. 1.

Referring to FIG. 1 there is illustrated schematically an inverter circuit 10 comprising a plurality of single-pole inverter stages A, B, ... K. The single-pole inverter is characterized as including two switching elements, i.e. A1 and A2, in contrast to the four switching elements employed in full bridge inverter circuits. While the single-pole inverters have been selected for the purpose of describing the invention, it is understood that an inverter circuit comprised of a plurality of single-phase bridges or three-phase bridges would be equally appropriate. Each inverter stage functions as a square wave generator by producing a square wave output voltage waveform with respect to the DC neutral, each being of the same magnitude but different phase angle.

In FIG. 2 there is represented as prior art a connection arrangement of inverter stage output transformers TA, TB, TC, ... TK, corresponding to the teachings of the above-identified patent.

The secondary windings of the transformers TA–TK are series connected to synthesize a stepwise approximated sinusoidal output waveform free of low order harmonics as illustrated in FIG. 3 by adding the outputs of the K square wave inverter stages which are sequentially phase displaced from one another by $\pi/K$ radians. According to this technique, the development of a multiphase harmonic neutralized sinusoidal output waveform requires that each inverter stage have an output transformer with a separate secondary winding for each output phase.

Each secondary winding is proportioned to produce a voltage in accordance with the following equation:

$$M_{KX} = \frac{\pi V_{RMS}}{K \sqrt{2}} \cos (\theta_K - \theta_X)$$

Where $M_{KX}$ = Magnitude of the square wave contributed by square wave generator, K, to the output phase voltage, X.

$V_{RMS}$ = Desired RMS value of the fundamental component of phase voltage X.

K = The number of square wave generators.

$\theta_K$ = Phase displacement of square wave generator K.

and $\theta_X$ = Phase displacement of phase voltage X.

If phase voltage X is assumed to be the reference ($\theta_X=0$) then the magnitude of each square wave generator's contribution will be proportional to the cosine of its angular displacement as is shown in FIG. 2.

The requirement for transformers with separate secondary windings for each output phase necessitates the use of transformers exhibiting undesirably high transformer KVA ratings. As noted above, a typical KVA rating in per units of output power for a three-phase inverter circuit utilizing the prior art technique for development of harmonic neutralized sinusoidal waveforms is 2.86, as compared to conventional inverter systems which exhibit transformer ratings of 2.46. The prior art KVA rating represents transformers of increased size and weight as compared to the transformers of the conventional inverter circuits and thus renders the prior art technique for producing harmonic neutralized sinusoidal waveforms less attractive for applications such as aircraft and spacecraft power systems.

The invention comprises a technique for interconnecting the output transformers of the inverter stages of an inverter circuit in a series-parallel cascade arrangement rather than the series arrangement of the prior art and in so doing effects a reduction of up to 59 percent in the required transformer rating. The cascade transformer interconnection technique is schematically illustrated in a representative inverter circuit embodiment in FIG. 4. The pyramidal transformer pattern produced by this interconnection scheme will hereinafter be referred to as a cascade interconnect arrangement.

Center tap outputs of the respective inverter stage output transformers are preset to establish the desired magnitude of output voltage signal at the proper phase angle, and the plurality of output transformers associated with each inverter phase are interconnected in a cascade arrangement to develop a harmonic neutralized sinusoidal output voltage waveform.

In FIG. 4 there is illustrated schematically an 18-pole inverter circuit 20 having inverter stage outputs A, B, C, ... R (where $R=2K$, and $K=9$ for this particular example) with respect to neutral N. The interconnection of inverter stage outputs A–H through the cascade arrangement of interphase transformers T1–T7 correspond to one phase of the inverter circuit 20 and result in the development of a harmonic neutralized sinusoidal voltage waveform $E_{XN}$ as shown in waveform B of FIG. 3. Two similar groupings of inverter stages G–N and M–B provide the remaining two output phase sinusoidal voltages $E_{YN}$ and $E_{ZN}$ respectively. As is apparent from the schematic diagram of FIG. 4, the novel technique for interconnecting the inverter stage output transformers in a cascade arrangement employs interphase transformers instead of the conventional isolation transformers used in the prior art technique.

In operation the interphase transformer T1, connected between inverter stage outputs A and B, develops an output voltage between tap B' and neutral N which is proportional to the vectorial summation of the output voltages at the inverter stage outputs A and B weighted by the cosines of their respective phase angles with respect to the output $E_{XN}$, or reference phase. To obtain desired proportioning between the inverter stage outputs at A and B, the turns ratio of the transformer sections between A and B', and B and B' must be properly selected to weight each inverter stage output by the cosine of its angular displacement from the output phase voltage $E_{XN}$.

The location of the taps on the transformers T1, T2, and T3 are given by the expressions:

$$\frac{A-B'}{A-B} = \frac{\cos\theta_B}{\cos\theta_A + \cos\theta_B}$$

$$\frac{B'-C'}{B'-C} = \frac{\cos\theta_C}{\cos\theta_A + \cos\theta_B + \cos\theta_C}$$

$$\frac{C'-D'}{C'-D} = \frac{\cos\theta_D}{\cos\theta_A + \cos\theta_B + \cos\theta_C + \cos\theta_D}$$

where A–B' indicates the number of turns of transformer T1 between the points A and B' of FIG. 4, A–B is the total number of turns between points A and B and (A–B')/(A–B) is the turns ratio of the transformer which locates tap B'.

The angles $\theta_A$, $\theta_B$, etc. are the angular displacements of inverter power stages A, B, etc. as defined by FIG. 2.

Also the locations of the taps on the transformers T4, T5 and T6 are given by the expressions:

$$\frac{H-G'}{H-G} = \frac{\cos\theta_G}{\cos\theta_G + \cos\theta_H}$$

$$\frac{G'-F'}{G'-F} = \frac{\cos\theta_F}{\cos\theta_F + \cos\theta_G + \cos\theta_H}$$

$$\frac{F'-E'}{F'-E} = \frac{\cos\theta_E}{\cos\theta_E + \cos\theta_F + \cos\theta_G + \cos\theta_H}$$

The location of the tap on T7 is given by the expression:

$$\frac{D'-X}{D'-E'} = \frac{\cos\theta_E + \cos\theta_F + \cos\theta_G + \cos\theta_H}{\cos\theta_A + \cos\theta_B + \cos\theta_C + \cos\theta_D + \cos\theta_E + \cos\theta_F + \cos\theta_G + \cos\theta_H}$$

With the proper selection of turns ratio of the transformers T1–T7, it follows that the cascaded group of transformers T1–T7 will result in an output voltage waveform, $E_{XN}$, at the tap X of transformer T7 which is proportional to the vectorial summation of the output voltages of the inverter stages A–H with each inverter stage output voltage weighted by the cosine of its respective phase angle. According to the teachings of the reference invention of Heinrich and Kernick, the harmonics of the voltages $E_{XN}$ are of the $18n\pm1$ order and all harmonics up to and including the fifteenth are cancelled.

Figure 5:
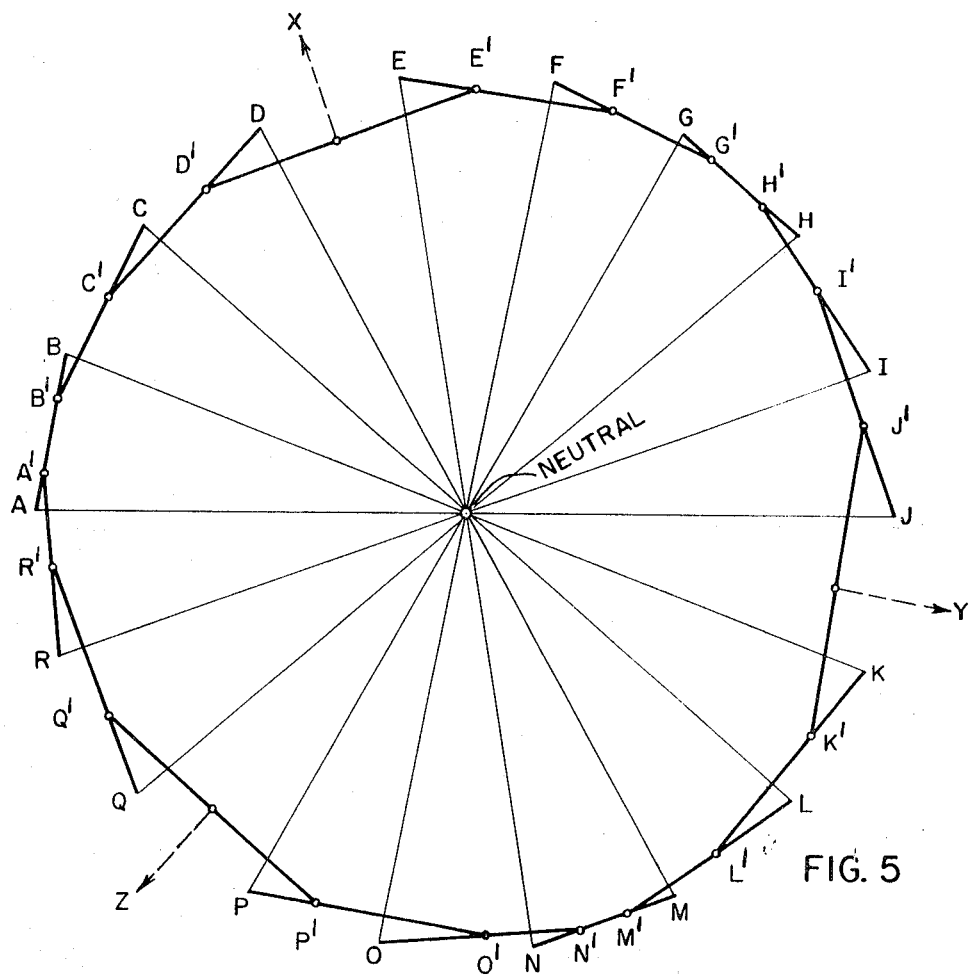
FIG. 5 illustrates a phasor diagram of a three-phase inverter embodying the invention.

As noted above the harmonic neutralization of the waveform $E_{XN}$ has been obtained with the use of interphase transformers rather than the isolation transformers typically utilized in the prior art technique. The utilization of the interphase transformer in a cascade interconnection arrangement to provide the desired harmonic neutralization of the output waveform effects a substantial reduction in weight and cost of the transformers in comparison to the prior art isolation transformers, and, furthermore, substantially reduces the total winding KVA requirement. A typical total winding KVA in this novel cascade transformer interconnection technique is 1.02 per unit output KVA as compared with 2.80 per unit output KVA required with the prior art technique of interphase transformer connection. This results in a saving of approximately 64 percent in KVA rating. The cascade transformer arrangement for all three output phases of the inverter circuit 20 is schematically illustrated in FIG. 5; the length of lines being proportional to the voltage to be supported between the respective terminals and taps.

A second embodiment of inverter stage outputs interconnected by means of a cascade interconnection of interphase transformers is illustrated in FIGS. 6, 7, 8 and 9. In contrast to the line-to-neutral voltage output waveforms, $E_{XN}$, $E_{YN}$, and $E_{ZN}$, developed by the inverter embodiment illustrated in FIGS. 4 and 5, the inverter embodiment illustrated in FIGS. 6–9 utilizes the cascade interphase transformer connection technique to develop harmonic neutralized line-to-line voltages.

Figure 6:
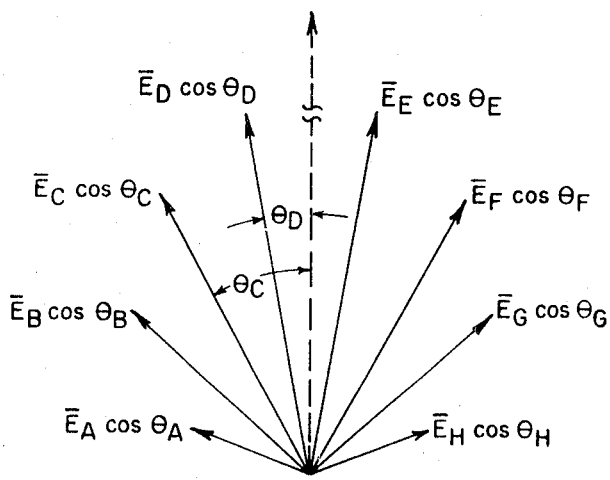
FIGS. 6 and 7A and 7B are phasor representations of the output voltages of one group of the inverter stages comprising the inverter of FIG. 1.

FIG. 6 illustrates the fundamental components of a harmonic neutralized line-to-line voltage $E_{XY}$ which is the result of the sum of the phasor output voltages corresponding to inverter stage outputs A–H. These phasor voltages represent one group of 18 phasor voltages of an 18-pole inverter in which each vector is evenly spaced at 20 electrical degrees. Each phasor voltage component is weighted by the cosine of its angular divergence from $E_{XY}$ as would be the case in the prior art harmonic neutralization technique.

Figure 7A:
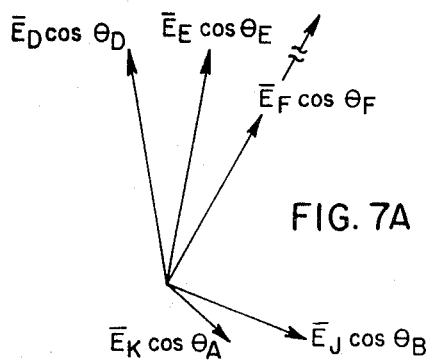
Figure 7B:
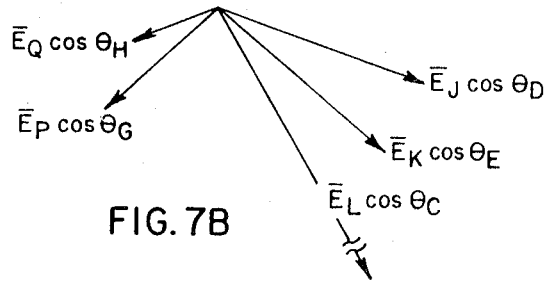

The phasor array of FIG. 6 can be considered as the difference of two subarrays illustrated as phasor arrays A and B of FIG. 7 which make up the $E_{XN_{DC}}$ and $E_{YN_{DC}}$ line-to-DC neutral voltages respectively according to the equation $\bar{E}_{XY}=\bar{E}_{XN_{DC}}-\bar{E}_{YN_{DC}}$. The line-to-neutral voltages are not harmonic neutralized waveshapes. However, when the line-to-neutral voltages $E_{XN_{DC}}$ and $E_{YN_{DC}}$ are combined to form the line-to-line voltage, $\bar{E}_{XY}$, the resultant waveshape will be a harmonic neutralized waveshape.

Figure 8:
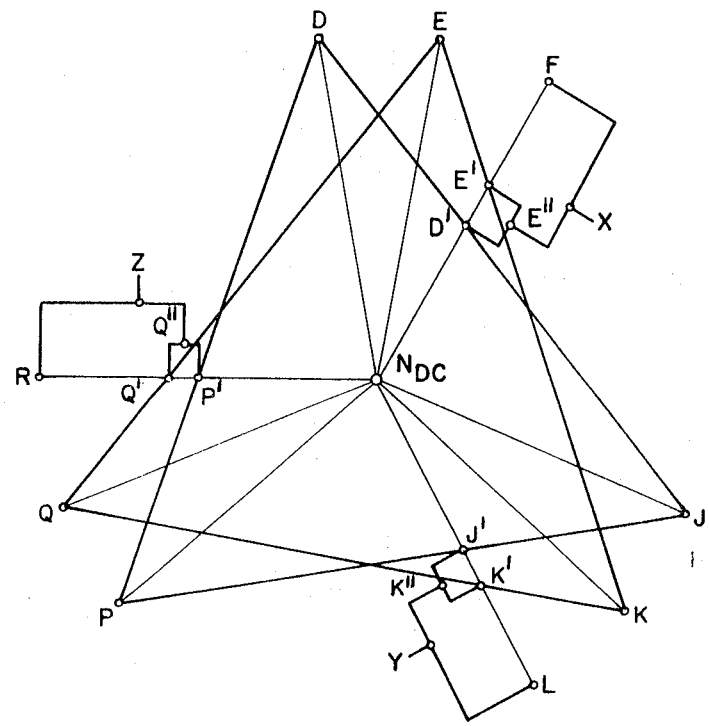
FIG. 8 is an illustration of a phasor array corresponding to an alternate inverter embodiment of the invention.

Referring to FIG. 8, the phasor array shown in phasor array A of FIG. 7 is obtained from poles D, E, F, J and K. As explained previously, the tap D' is chosen to weight pole voltage D by $\cos\theta_D$ and pole voltage J by $\cos\theta_B$:

$$\frac{D-D'}{D-J} = \frac{\cos\theta_B}{\cos\theta_B + \cos\theta_D}$$

$$= \frac{\cos 50°}{\cos 50° + \cos 10°} = 0.394$$

The voltage at tap D' then is:

$$\bar{E}_{D'} = \frac{1}{\cos 10° + \cos 50°}[\cos 10°\ \bar{E}_D + \cos 50°\ \bar{E}_J]$$

The tap E' is chosen to weight pole voltage E by cos $\theta_E$ and pole voltage K by cos A:

$$\frac{E-E'}{E-K} = \frac{\cos \theta_A}{\cos \theta_A + \cos \theta_E}$$

$$= \frac{\cos 70°}{\cos 70° + \cos 10°} = 0.258$$

The voltage at tap $E'$ is:

$$\bar{E}_{E'} = \frac{1}{\cos 10° + \cos 70°} [\cos 10° \bar{E}_E + \cos 70° \bar{E}_K]$$

The tap $E''$ is chosen to weight $E_{D'}$ by (cos 10°+cos 50°) and $E_{E'}$ by (cos 10°±cos 70°):

$$\frac{E'-E''}{E'-D'} = \frac{\cos 10° + \cos 70°}{2 \cos 10° + \cos 50° + \cos 70°} = 0.551$$

The voltage at $E''$ is:

$$\bar{E}_{E''} = \left[\frac{1}{2 \cos 10° + \cos 50° + \cos 70°}\right]$$

$$[\cos 10° \bar{E}_D + \cos 10° \bar{E}_E + \cos \theta_B \bar{E}_J + \cos \theta_A \bar{E}_K]$$

Finally the tap X is chosen to weight E'' by (2 cos 10°+cos 50°+cos 70°) and $E_F$ by (cos $\theta_F$, i.e. cos 30°).

$$\frac{F-X}{F-E''} = \frac{2\cos 10° + \cos 50° + \cos 70°}{2 \cos 10° + \cos 30° + \cos 50° + \cos 70°} = 0.779$$

The line to neutral voltage $\bar{E}_{XN_{DC}}$ is equal to:

$$\bar{E}_{XN_{DC}} = \left[\frac{1}{2 \cos 10° + \cos 30° + \cos 50° + \cos 70°}\right]$$

$$[\cos 10° \bar{E}_D + \cos 10° \bar{E}_E + \cos 30° \bar{E}_F$$
$$+ \cos 50° \bar{E}_J + \cos 70° \bar{E}_K]$$

$$= \psi [\cos \theta_D \bar{E}_D + \cos \theta_E \bar{E}_E + \cos \theta_F \bar{E}_F + \cos \theta_B \bar{E}_J$$

$$+ \cos \theta_A \bar{E}_K] \text{ wherein } \psi = \frac{2E_{DC}}{\pi}$$

FIG. 9 illustrates schematically the interconnections necessary to synthesize output line voltage X.

The phasor array B of FIG. 7 is obtained in a similar manner from pole voltages J, K, L, P and Q. The complete three-phase interconnection which synthesizes $\bar{E}_X$, $\bar{E}_Y$ and $\bar{E}_Z$ is shown in FIG. 8.

It is apparent from the illustrations in FIGS. 6-9 that the inverter poles required in this second embodiment are required to be multiples of three-phase sets. This latter characteristic supports the construction of three-phase modules which may be grouped to form six-pole, nine-pole, 12-pole, etc. inverters as the application requires.

The second embodiment of the cascade interconnect arrangement of inverter output transformers requires half the number of inverter poles of the first embodiment for the same degree of harmonic neutralization. Furthermore the magnitude of the current from each pole is equal and the power factor of each pole is equal to the load power factor for a balance three-phase mode. This is not true in the first embodiment.

The first embodiment does, however, provide for either a three- or four-wire three-phase output with a minimum of transformer winding KVA. The second embodiment in its basic form can only provide a three-wire output.

A fourth wire or AC neutral can be provided for the second embodiment in a number of ways. One way in which AC neutral may be formed is to connect a three-phase, wye-connected transformer to the three-wire output. The secondary windings of the transformer are connected in closed delta to form a tertiary winding. FIG. 10 illustrates such a transformer and FIG. 11 illustrates the effect it has upon the instantaneous value of the AC neutral with respect to the DC neutral. The presence of the tertiary winding forces the AC neutral to assume a potential which allows the instantaneous sum of the line-to-AC neutral voltages to be zero. If the sum of the three-phase voltages is not zero, a current will circulate in the tertiary winding which will tend to force the sum to zero.

To determine the new line-to-AC neutral voltage waveshape, the three line-to-DC neutral voltages are summed. The sum is a third harmonic quasi-squarewave. If one-third of this sum is subtracted from each of the line-to-DC neutral waveshapes, the condition imposed by the tertiary winding is satisfied and the new line-to-AC neutral waveshapes are obtained. These line-to-AC neutral voltages are of the harmonic neutralized class.

The rating of the tertiary transformer depends upon the degree of load unbalance. For balanced load, the fundamental components of phase current sum to zero, thus the current flowing into or out of the AC neutral is zero and the rating of the transformer is nearly zero. If it is assumed that the maximum load unbalance is one-third per unit of a single-phase load, the winding KVA rating of the tertiary transformer becomes 2/9 per unit. The total winding KVA in per unit power now becomes 1.54 rather than 1.32.

We claim:

1. In power inverter apparatus for supplying AC voltage to an electrical load from a source of DC voltage, the combination of, a number of phase displaced voltage generators, each of said voltage generators developing a pulse shape output, a cascade interconnect arrangement of a plurality of interphase transformers operatively connected between said voltage generators and said electrical load, each of said interphase transformers having a positional tap between first and second terminal ends, said positional taps interconnecting said interphase transformers to form said cascade interconnect arrangement with said AC output voltage being developed at the tap position of a final interphase transformer, said positional taps of the respective interphase transformers being located between said first and second terminal ends to effectively weight the output voltage of each of said voltage generators by the cosine of the angle of divergence defined by the phase position of the output of each of said voltage generators with respect to the phase position of said AC output voltage, said cascade interconnect arrangement of said plurality of interphase transformers combining the outputs of said voltage generators to synthesize a harmonically neutralized AC output voltage.

2. In power apparatus as claimed in claim 1 wherein said AC output voltage is sinusoidal.

3. In power inverter apparatus as claimed in claim 1 wherein the AC output voltage developed by said cascade interconnect arrangement of interphase transformers is proportional to the vectorial summation of the output voltage of said voltage generators.

4. In the power inverter apparatus as claimed in claim 1 wherein the tap position of the respective interphase transformers of said pyramidal group is selected to establish a turns ratio between the transformer sections defined by the tap position to properly weight the voltages supplied to the ends of said interphase transformers and develop a resultant vectorial voltage summation at the tap.

5. In the power inverter apparatus as claimed in claim 1 wherein said inverter apparatus is a multiphase inverter apparatus comprising at least three of said pyramidal groups of interphase transformers operatively connected to said voltage generators, each of said pyramidal groups developing a harmonic neutralized AC output phase voltage.

6. In the power inverter apparatus as claimed in claim 5 wherein said interphase transformers of the respective pyramidal groups are interconnected to develop a harmonic neutralized AC phase output voltage between the tap position of said final interphase transformer and the DC neutral of said inverter apparatus.

7. In the power inverter apparatus as claimed in claim 5 wherein the interphase transformers of the respective pyramidal groups are interconnected to develop a harmonic neutralized AC line-to-line output voltage between the taps of the final interphase transformers of the respective pyramidal groups.

8. In the power inverter apparatus as claimed in claim 7 including means for establishing an AC neutral to provide harmonic neutralized line-to-AC neutral output voltages.

9. In the power inverter apparatus as claimed in claim 4 wherein the output voltage of each individual voltage generator is supplied to one end of one said interphase transformers, and the voltage developed at the tap of each of said interphase transformers being supplied to one end of one of said interphase transformers comprising a pyramidal group.

10. A method for operating a power inverter apparatus for supplying AC voltage to an electrical load from a source of DC voltage, comprising the steps of, generating a plurality of phase-displaced pulse shape output voltages, supplying said pulse shape output voltages to a plurality of interphase transformers having positional taps between first and second terminal ends, said positional taps interconnecting said interphase transformers to form a cascade interconnect arrangement of interphase transformers with said AC output voltage being developed at the tap position of a final interphase transformer, and locating the taps of the respective interphase transformers between said first and second terminal ends to weight the pulse shape output voltages by the cosine of the angle of divergence defined by the phase position of each of said pulse shape output voltages with respect to the phase position of said AC output voltage.

* * * * *